(No Model.)

G. S. TIFFANY.
BRICK OR TILE TABLE.

No. 444,227. Patented Jan. 6, 1891.

WITNESSES
INVENTOR
George S. Tiffany,
by A. G. Heylmun,
Attorney

UNITED STATES PATENT OFFICE.

GEORGE S. TIFFANY, OF TECUMSEH, MICHIGAN.

BRICK OR TILE TABLE.

SPECIFICATION forming part of Letters Patent No. 444,227, dated January 6, 1891.

Application filed March 6, 1890. Serial No. 342,892. (No model.)

*To all whom it may concern:*

Be it known that I, GEORGE S. TIFFANY, a citizen of the United States of America, residing at Tecumseh, in the county of Lenawee and State of Michigan, have invented a new and useful Brick or Tile Table, of which the following is a specification.

My invention has relation to improvements in means for receiving, loading, and removing the loaded platen from a brick or tile machine, and the objects are to provide an improved table to receive loaded platens and means by which the same may be taken or lifted from the table onto the barrow or car and conveyed from the machine to the kiln or other depository.

My invention will be hereinafter fully described, and the parts and their combinations as claimed by me specifically pointed out in the claims.

I have fully and clearly illustrated one approved construction of my invention in the accompanying drawings, wherein—

Figure 1:
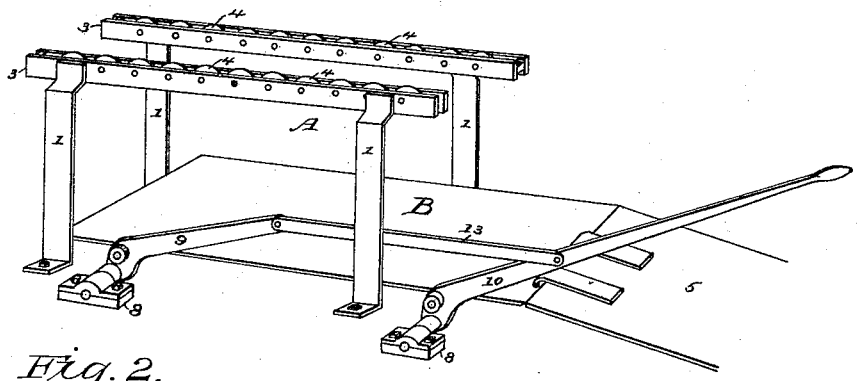
Figure 2:
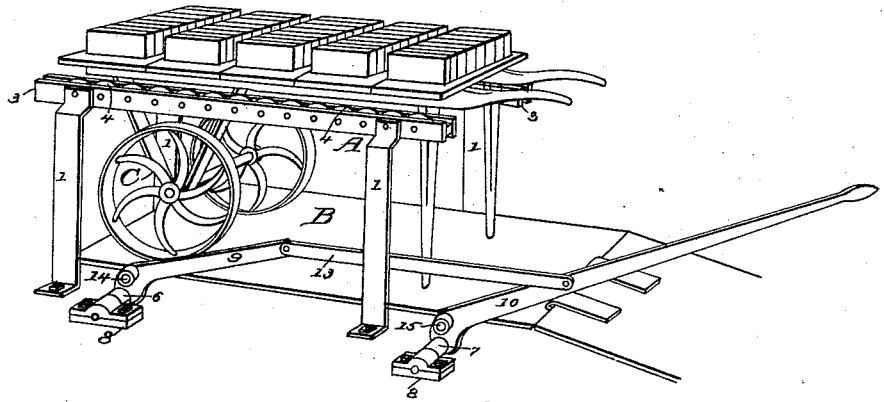
Figure 3:
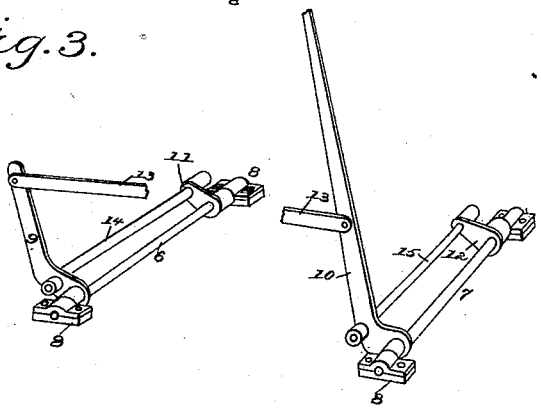

Figure 1 is a perspective of the table on which the loaded platens are shoved by the operation of the machine, and also showing the lifting-platform. Fig. 2 is a perspective of the table with a barrow or truck arranged on the lifting-platform, and showing the loaded platens lifted from the rails of the table. Fig. 3 is a detail of the lifting mechanism.

A designates the table, composed of standards 1, supported at their top, and bars 3, having mounted thereon a number of rollers 4, arranged with their upper parts projecting above the edge of the bars. I have shown the bars 3 as consisting of two parallel bars secured at their ends to each other and having the rollers journaled between them. The table consists of two of the supporting-bars 3, arranged parallel to each other and at such distance apart as to take the ends of the platens on the rollers as they are pushed from the cutting or delivery part of the machine. The end of the table is arranged in such relation to the cutting or delivery mechanism of the machine that the platens shall be received therefrom and then pushed successively on by the other one to the table, as indicated in their arrangement in Fig. 2 of the drawings. Because this table may be used with any brick or tile machine constructed to use these platens, I have not deemed it essential to a full and legal understanding of the invention that such machine should be illustrated herein.

So far as I am aware, after the platens have been loaded from the machine they are either carried or lifted to some means for taking them away, or they are shoved directly onto a truck. The first is premature and laborious and the second is objectionable in that the platens are likely to be disturbed in their progression over the truck, and it is inconvenient to replace a truck while the filled one is being removed. My invention removes these objections and provides a means by which the progression of the platens is not interfered with, and the table may be cleared speedily and the truck loaded expeditiously. To accomplish these objects, I arrange a platform B longitudinally with the table and between the legs thereof, as shown in Fig. 2, the edges of the platform loosely resting against the inner faces of the legs or standards, which thus constitute guides to prevent the lateral displacement of the platform. At the front end of this platform is preferably hinged a leaf 5, which, when the platform is raised, assumes an inclined position and permits the truck to descend from the platform without any jarring. To raise this platform, I mount two shafts 6 7 on bearings 8, and to the shafts secure levers 9 10 and arms 11 12, the levers being connected by a bar 13, as shown. Near the base of each lever, above the connection to their respective shafts, is fixed one end of rods 14 15, having their other ends fixed in the ends of arms 11 and 12. The lever 10 is extended upward to form a hand-rod. The platform rests on the bars or rods 14 15, and it will be readily perceived that by moving the levers the bars 14 15 are raised and lowered, thereby lifting and lowering the platform, and with it whatever may be upon it. Instead of the mechanism herein shown and described, two arms may be fixed on the shafts, and, having their ends connected, serve the purpose of lifting.

C designates a truck or barrow the rails of which are normally on the plane lower than the bottoms of the platens when on the table, in order that when the platform is in normal position the truck may be run thereon and under the platens without disturbing the latter in the least.

The operation or use of the device or means is as follows: The platens with their loads being shoved from the machine on the table and the platform being at its lowest position, the truck is run under the platens, and when in proper position the lever is moved in direction to lift the platform and truck, which moves the upper part of the truck above the table, engaging and lifting the platens. The truck can then be withdrawn with its load, and the table is clear to receive other platens from the machine.

Having thus described my invention and explained the principle thereof and the best mode in which I contemplate applying that principle so as to distinguish it from other inventions in the art, I now proceed to particularly point out and distinctly claim the part, improvement, and combinations.

I claim as my invention as follows:

1. The table to receive bricks or tiles on platens directly from a brick or tile machine, in combination with a vertically-movable platform arranged under said table and adapted to receive and bodily raise a truck under the platens to unload the latter from the table for removal, and devices, substantially as set forth, to lift the said platform.

2. The brick or tile machine receiving-table comprising the side rails having rollers and supports for said rails, the platform arranged between said rails at the base of the supports and adapted to receive a truck, and means, substantially as described, to raise and lower said platform and truck bodily, substantially as described.

3. The combination, with the brick or tile machine receiving-table on which loaded platens are discharged, of the vertically-movable platform under the table to receive the truck and having the hinged extension at one end, and devices, substantially as specified, for raising and lowering the platform and truck.

In witness whereof I have hereunto set my hand in the presence of two attesting witnesses.

GEO. S. TIFFANY.

Attest:
CHARLES BURRIDGE,
WALTER C. BURRIDGE.